United States Patent [19]

Chauveton

[11] Patent Number: 4,495,771
[45] Date of Patent: Jan. 29, 1985

[54] STIRLING-CYCLE ENGINE

[75] Inventor: Claude Chauveton, Chalabre, France

[73] Assignee: Creusot-Loire, Paris, France

[21] Appl. No.: 484,029

[22] Filed: Apr. 11, 1983

[30] Foreign Application Priority Data

Jun. 4, 1982 [FR] France ................ 82 09776

[51] Int. Cl.³ ............................... F02G 1/00
[52] U.S. Cl. ........................... 60/525; 60/517;
74/18.1; 277/212 FB
[58] Field of Search .............. 60/517, 525; 74/18,
74/18.1, 18.2; 277/30, 88, 212 FB

[56] References Cited

U.S. PATENT DOCUMENTS 3,281,065 10/1966 Chaffiotte ................ 74/18.1 X
3,306,134 2/1967 Winiarski ................ 74/18.1 X
4,372,116 2/1983 Dineen ..................... 60/517 X
4,381,648 5/1983 Balas, Jr. ................. 60/517

Primary Examiner—Stephen F. Husar
Attorney, Agent, or Firm—Pollock, Vande Sande & Priddy

[57] ABSTRACT

A stirling cycle engine, especially for refrigerating motors, comprising a housing in which are assembled a rotating shaft, at least three working cylinders arranged in parallel round the shaft, a double-acting piston in each of the cylinders, and a mechanical transmission converting the reciprocating movement of the pistons into a rotary movement of the shaft. The housing has a first chamber (1) in which the rotating shaft is assembled, and a second chamber (2) in whch the mechanical transmission is assembled. The latter consists of an orbiting oscillating plate (13, 14) immobile in rotating and having an axis which describes a conical surface about the rotating shaft, and of articulated connections linking each piston (4) to the oscillating plate. An elastic gasket (18, 19) between the housing (11) and the oscillating plate (13, 14) prevents communication between the first and second chambers (1, 2), and each articulated connection (15, 22) is assembled in a receptacle (3) of a component connected rigidly to the piston (4), the space in the receptacle (3) being isolated from the second chamber (2) by elastic gaskets (23).

5 Claims, 6 Drawing Figures

STIRLING-CYCLE ENGINE

FIELD OF THE INVENTION

The present invention relates to engines which use a working fluid undergoing a thermodynamic change corresponding to the Stirling cycle. These engines are generally used either as driving engines converting heat energy into mechanical energy or as heat pumps or refrigerating machines.

It is known to produce a Stirling-cycle engine consisting of four double-acting reciprocating pistons which are connected kinematically to one or more rotating shafts. In such engines, the working fluid is transferred cyclically from one working chamber to another, passing successively through a heat source, a regenerating exchanger and a cold source. The working fluid is never renewed and must therefore preserve its characteristics indefinitely. In such engines, it is necessary to provide sealing devices making it possible to prevent any contamination of the working fluid, and especially to prevent lubricating substances from penetrating into this working fluid, thus clogging the regenerating exchanger and reducing the coefficient of heat exchange with the heat and cold sources.

To prevent such contamination of the working fluid, it would be possible to design an engine completely free of lubricated mechanical members, but such a solution would not be very satisfactory because of the complexity of the mechanical transmission necessary to convert the reciprocating movement of the pistons into a rotary movement of the output shaft of the engine. On the other hand, since it is practically impossible to ensure total sealing between a cylinder and a piston having a linear and reciprocating relative movement, positive sealing devices have been envisaged, i.e. devices using a deformable element constituting an absolute barrier to passage of the working gas. However, these positive sealing devices have not been entirely satisfactory because of problems of acceleration and problems involving the creation of variable pressure differences on either side of the sealing devices, thus resulting in rapid damage to them. As regards friction sealing devices based on friction linings, these are not absolutely effective, and after a certain time the greasy substances of the mechanical transmission succeed in contaminating the working fluid.

The present invention is aimed at a Stirling-cycle engine the arrangement of which makes it possible to remedy the disadvantages mentioned above.

SUMMARY OF THE INVENTION

The invention relates, more particularly, to a Stirling-cycle engine comprising essentially a housing in which are assembled a rotating shaft, four working cylinders arranged in parallel round the shaft, a double-acting piston in each of the said cylinders, and a mechanical transmission converting the reciprocating movement of the pistons into a rotary movement of the shaft, the said housing of the engine providing a first chamber, in which the rotating shaft is assembled, and a second chamber, in which the mechanical transmission is assembled.

An essential characteristic of the invention is that the mechanical transmission consists of an oscillating plate which is immobilized in rotation and which is driven in an orbital movement so that its longitudinal axis describes a conical surface round the rotating shaft, and of articulated connections linking each piston to the oscillating plate, that an elastic gasket is located between the housing and the oscillating plate so as to prevent any communication between the first chamber and the second chamber, and that each of the articulated connections is assembled in a space isolated from the second chamber by elastic gaskets connecting the oscillating plate, in the vicinity of the corresponding connection, to a component connected to the corresponding piston.

BRIEF DESCRIPTION OF THE DRAWINGS

Other characteristics and advantages of the invention will emerge from the detailed description of the following exemplary embodiment illustrated in the attached drawings.

DETAILED DESCRIPTION

Figure 1:
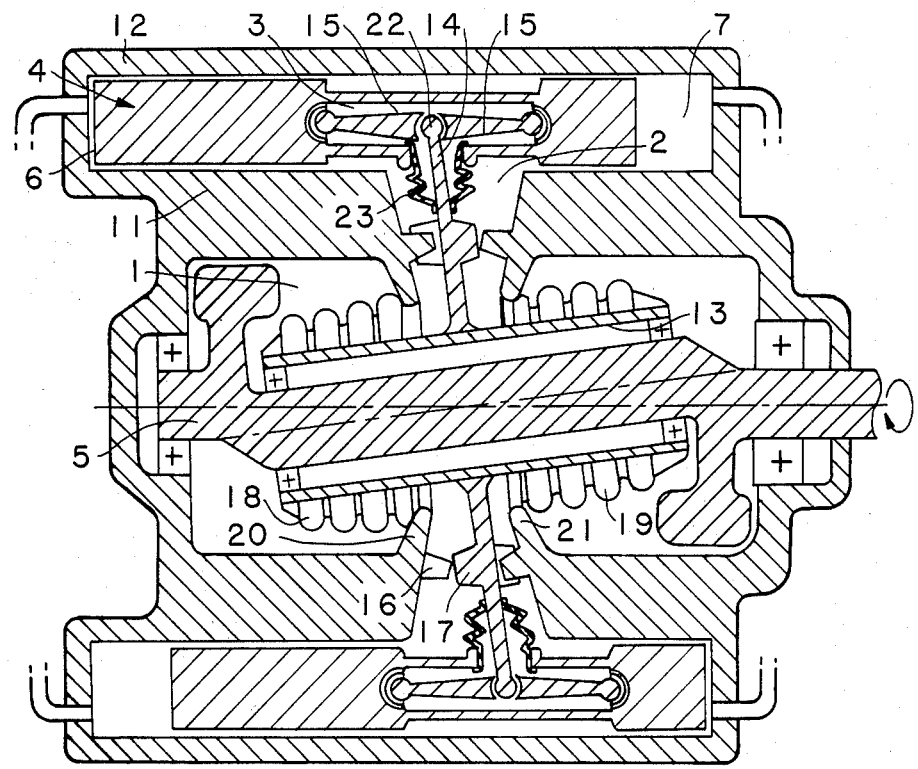
FIG. 1 is a diagrammatic view, in longitudinal section, of an engine according to the invention.
Figure 2:
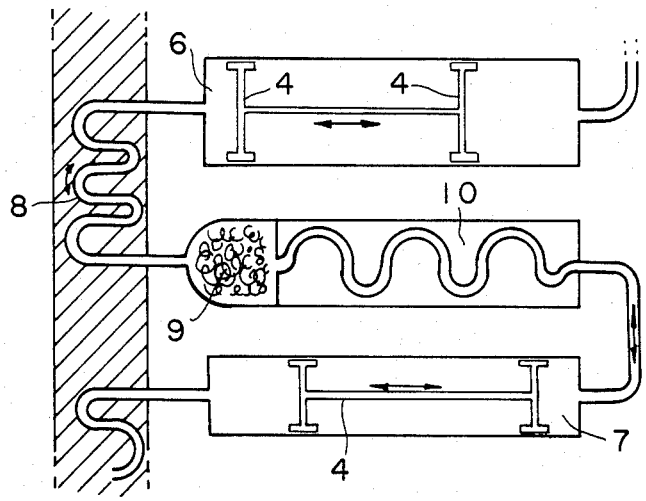
FIG. 2 shows diagrammatically the thermodynamic operation of an engine according to the invention.

Referring to FIGS. 1 and 2, we shall describe briefly the operating principle, known per se, of a Stirling-cycle engine to which the present invention can apply.

This Stirling-cycle engine consists essentially of at least three double-acting pistons 4 arranged symmetrically and in parallel round the axis of a central rotating shaft 5. As a general rule, there are four of these pistons 4. In this case, these pistons 4 are driven in a reciprocating movement of the same period and with a successive phase shift of 90°. Consequently, a first and a second chamber 6 and 7, the volume of which varies as a function of the reciprocating movement of the piston, corresponds to each double-acting piston 4. Each of these first six chambers communicates with the chamber 7 of the following cylinder by means of a circuit which passes successively through a heat source 8, a regenerating exchanger 9 and a cold source 10. This Stirling-cycle engine furthermore incorporates a mechanical transmission making it possible to convert the reciprocating movements of the pistons 4 into a rotary movement of the central shaft 5. Referring to the diagrammatic drawing of FIG. 1, the various essential mechanical elements forming an engine according to the invention can be distinguished. Mounted in the housing 11 of this engine are the rotating shaft 5, the working cylinders 12 arranged in parallel round the shaft, the double-acting pistons 4 located in each of the cylinders, and the mechanical transmission connecting the pistons to the rotating shaft. The housing 11 provides a first chamber 1, in which the rotating shaft 5 is assembled, and a second chamber 2, in which the mechanical transmission is assembled. This mechanical transmission consists mainly of a cylindrical hub 13 to which radially extending arms 14 are connected rigidly. The end of each arm 14 is connected to the corresponding piston 4 by means of an articulated connection 15. The hub 13 is mounted rotatably about the central part of the rotating shaft 5, and the axis of rotation of the hub forms a certain angle alpha to the axis of rotation of the shaft 5. The assembly consisting of the hub 13 and the arms 14 consequently forms an oscillating plate which can be driven in an orbital movement, the axis of which describes a conical surface round the axis of the rotating shaft 5. However, this oscillating plate is immobilized in rotation by means of suitable guide elements 16, 17. These elements provide the reaction of the housing on the shaft to generate the drive torque. These elements also ensure the correct positioning of the ends of the arms 14 in relation to the pistons.

The chamber 1 is isolated completely from the chamber 2 by means of an elastic gasket connecting the hub 13 to the housing 11. As shown in FIG. 1, this elastic gasket preferably consists of two bellows 18, 19 arranged round the hub 13, one of the bellows 18 connecting in a sealing manner one end of the hub 13 and a radial web 20 connected to the housing 11, and the other bellows 19 connecting in a sealing manner the other end of the hub 13 and another radial web 21 connected to the same housing 11.

By arranging these sealing gaskets 18, 19 in this way, all communication between the chambers 1 and 2 is prevented. It thereby becomes possible to have, in the chamber 1, an atmosphere which permits lubrication of the moving mechanical components. It is possible to envisage, for example, the lubrication of all the bearings located between the housing 11 and the rotating shaft 5 as well as the bearings located between the hub 13 and the central part of the shaft 5, all these bearings being arranged inside the chamber 1. The chamber 1 is thus isolated completely from the outside and from the chamber 2 both by the internal walls of the housing 11, by the gaskets 18 and 19 and by the internal wall of the hub 13. Since the hub 13 does not rotate in relation to the housing 11, but simply has an oscillating movement, the bellows 18 and 19 can be fastened firmly at their two ends, thus guaranteeing absolute sealing. Since, on the other hand, the angle of oscillation of the hub 13 is relatively small, these bellows experience movements of low amplitude and can thus withstand stress when the shaft 5 rotates at high speed.

Under these conditions, the chamber 2 certainly cannot receive any contaminating particle, such as lubricant, coming from the chamber 1.

Each arm 14 of the oscillating plate is connected to each double-acting piston 4 by means of two push-rods 15 which are located on either side of the arm 14 and are articulated to it by means of a ball joint 22. The assembly consisting of the push-rods 15 and their articulated joint 22 is located in a receptacle provided in the piston 4 or in a component connected rigidly to this piston 4. There is also an elastic gasket 23 connecting the arm 14 to the piston 4 at the receptacle so that the receptacle 3 containing the articulated joint elements constitutes a chamber which is completely isolated from the chamber 2. Under these conditions, it is possible to provide in the chamber 3 a lubricating atmosphere making it easier for the articulation elements of the push-rods and the ball joint to function, while guaranteeing that no lubricating substance can pass into the chamber 2.

The chamber 2 is therefore limited at the same time by the walls of the housing 11, the sealing gaskets 23, the bellows 18 and 19 and the radial webs 20 and 21 and by the outer face of the hub 13. Since the sealing cannot be perfect between the double-acting piston 4 and the cylinder 12 in which it executes a reciprocating movement, it is still possible for a certain quantity of gas to pass from the working chambers 6 and 7 towards the chamber 2, and vice versa. Since it is possible to guarantee a perfectly pure atmosphere in the chamber 2 by means of the arrangements according to our invention, these leaks at the piston 4 present no danger of contamination of the working gas contained in the working chambers 6 and 7. It is possible, moreover, to fill the chamber 2 with a gas having a composition identical to that of the working gas. Thus, the working gas can flow for a very long time through the heat exchangers of the heat source 8, the regenerating exchanger 9 and the cold source 10, with the guarantee that no greasy substance or the like will be deposited on the surfaces of these exchangers, thus ensuring, for a long period of operation, that the heat exchangers will be effective and consequently that the performances and efficiency of the engine will be maintained completely.

Figure 3:
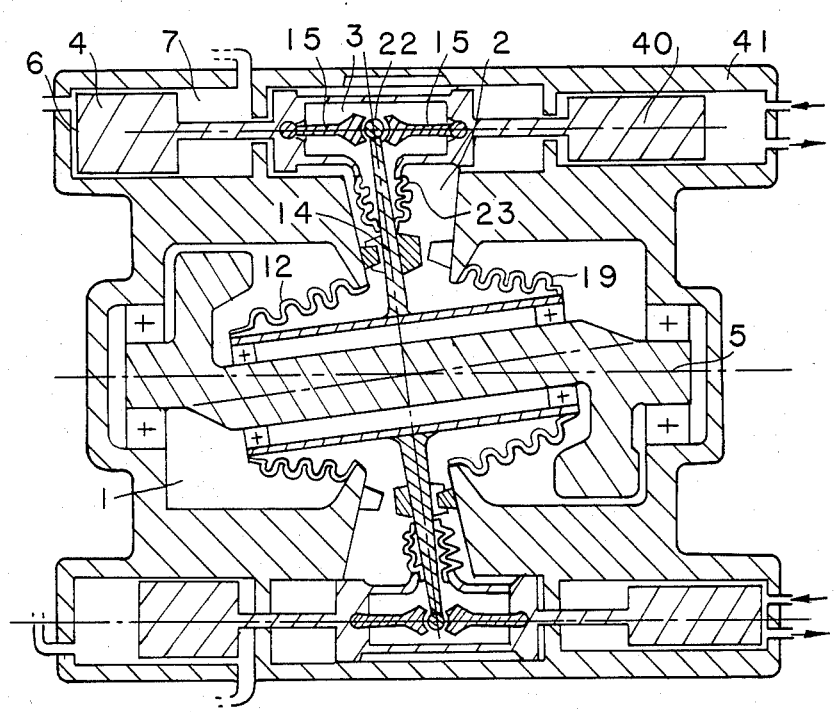
FIG. 3 is a diagrammatic view, in longitudinal section, of an alternative engine according to the invention.

FIG. 3 illustrates an alternative embodiment. In this engine, the kinematics are completely identical to those described above; the same isolated chambers 1, 2 and 3 are present again, the only difference being in the arrangement of the double-acting piston 4. This double-acting piston 4 is not arranged on either side of the articulated connection 22, but is arranged only on one side. On the opposite side to the piston 4 there is another piston 40 which is connected rigidly to the piston 4 and is movable within a cylinder 41 with a reciprocating movement and which can serve to form a pump. Under these conditions, it will be noted that this engine comprises both a motor and a pump. Although such an engine has a different use, there is the same arrangement of the connecting elements 15 between the arm 14 and a component connected to the piston 4 within one and the same receptacle 3, and there are also the same gaskets 18, 19 and 23 making it possible to isolate the chamber 2 completely.

Figure 4:
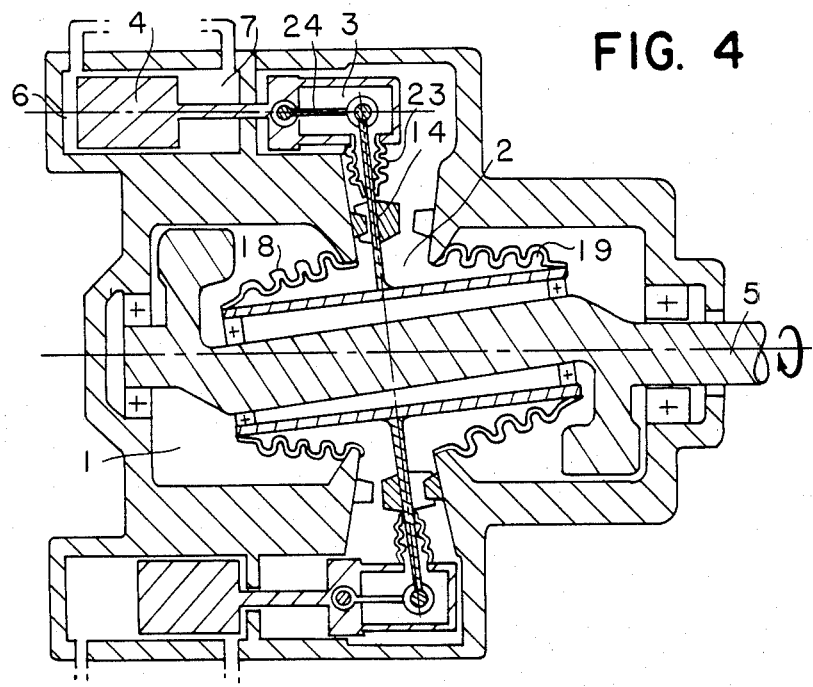
FIG. 4 is a diagrammatic view, in longitudinal section, of another alternative engine according to the invention.

FIG. 4 illustrates another alternative embodiment in which, as in FIG. 3, the piston 4 is located only on one side in relation to the articulated connection, this engine having no other piston located on the other side of the articulated connection. There is, again, the same receptacle 3 provided in a component connected rigidly to the double-acting piston 4 isolated from the chamber 2 by means of a gasket 23; there are also the same gaskets 18 and 19 isolating the chamber 1 from the chamber 2. The only difference is that the connection between the component linked to the piston 4 and the arm 14 is made by means of a single push-rod 24 which can be subjected both to compression and traction and which is connected by joints to the component connected to the piston 4, and to the ball-shaped end of the arm 14.

Figure 5:
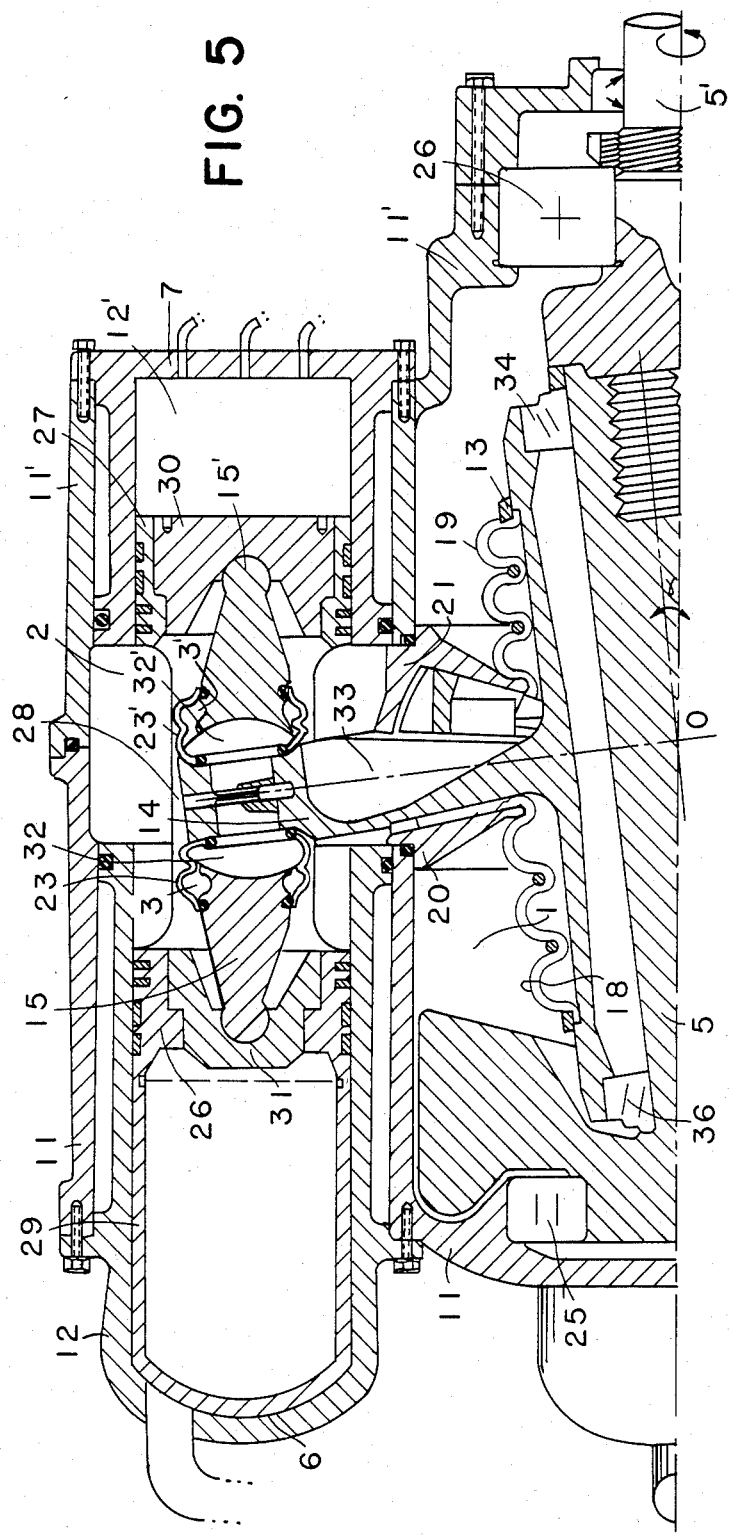
FIG. 5 is a view, in longitudinal section, of an engine according to the invention, in a preferred embodiment.

As a better illustration of the invention, we have shown in FIG. 5 an especially advantageous constructive arrangement of this invention. The housing of the engine, which is made in two parts 11, 11' to make assembly easier, may be seen in the longitudinal halfsection of FIG. 5. Mounted rotatably in this housing is a rotating shaft made in two rigidly connected parts 5, 5' and supported by two bearings 25 and 26. This engine incorporates four double-acting pistons arranged parallel to the axis of the shaft 5 at an equal distance from this axis and at 90° relative to one another. Each double-acting piston consists of two parts 26, 27 ensuring sealing by means of segments, these parts being arranged on either side of the articulated connection and being connected rigidly by means of a rigid connecting part 28. The part 26 of the piston, which is located on the side of the chamber 6 communicating with the heat source, is extended by a cylindrical component 29 having thin walls and forming the head of the piston. The other part 27 of the piston has a hollow shape and is shut off by a component 30 forming the head of the piston on the same side as the chamber 7. The part 26 of the piston also incorporates a component 31 in the form of a spherical cup concave in the direction of the articulated connection, and the component 30 fastened to the inside of the part 27 of the piston comprises itself a spherical surface concave in the direction of the articulated connection. Two push-rods 15 and 15' bear respectively on the spherical surfaces of the two components 30 and 31. The other ends of these push-rods 15 and 15' each have a concave spherical face in which is accommodated a spherical component 32, 32' made in two parts mounted on the peripheral end of the corresponding radial arm 14. The oscillating plate therefore comprises the four radial arms 14 corresponding to the four double-acting pistons, these radial arms being connected rigidly to the cylindrical hub 13 which surrounds the central part of the rotating shaft 5, with bearings 34, 36 interposed between the hub 13 and the shaft 5. The bellows 18 surrounds the hub 13, has one end connected rigidly to one end of the hub 13 and has its other end connected rigidly to the circular rim of an annular component 20, the peripheral part of which is fastened rigidly to the housing 11. The bellows 19 is assembled in an identical way on the hub 13 and connects the other end of this hub 13 and the edge of a component 21 arranged symmetrically in relation to the component 20.

During the reciprocating movement of the double-acting piston 4, the spherical part 32 mounted on the end of the oscillating plate is driven in a slight relative movement in relation to the pistons. This results in a slight pivoting of the push-rods 15 and 15' in relation to the ball joint 32 and in relation to the corresponding components 31 and 30 connected to the double-acting piston. Because of the low amplitude of the relative movements between the push-rods and the components 31 and 30, the surfaces subject to corresponding friction are not lubricated. To prevent any wear, the materials of these components can be selected so that the friction takes place, for example, between a steel surface and a carbon surface. On the other hand, since the relative movement of the spherical component 32 in relation to the push-rods 15 and 15' is greater, lubrication must be provided at these components executing a relative movement, and for this reason it is necessary to provide a device which makes it possible to prevent lubricating substances from passing towards the chamber 2. This sealing device consists of the two bellows gaskets 23 and 23', the bellows gasket 23 connecting in a sealing manner the push-rod 15 and a peripheral zone of the spherical component 32 connected to the oscillating plate and the other bellows gasket 23' connecting in a sealing manner the other push-rod 15' and a peripheral zone of the spherical component 32. Two chambers 3 and 3' which are perfectly isolated and which can be filled completely with a preferably incompressible liquid lubricant or with a grease are produced in this way.

All the mechanical components 31, 15, 23, 32 and the components 15', 23' and 32' can be assembled within the double-acting piston 4 by introducing these components through the hole made in the part 27 of this piston and subsequently screwing the component 30 inside this part 27 of the piston.

When the kinematics resulting from this mechanical assembly are examined in detail, it may be seen that, when the ball joint 32 is in an extreme longitudinal position, a slight play arises at the push-rods 15 and 15', but for practical production work conventional at the present time, a calculation will show that the variation in this play, linked to kinematic functioning, does not exceed a few hundredths of a millimeter and is therefore perfectly acceptable.

Figure 6:
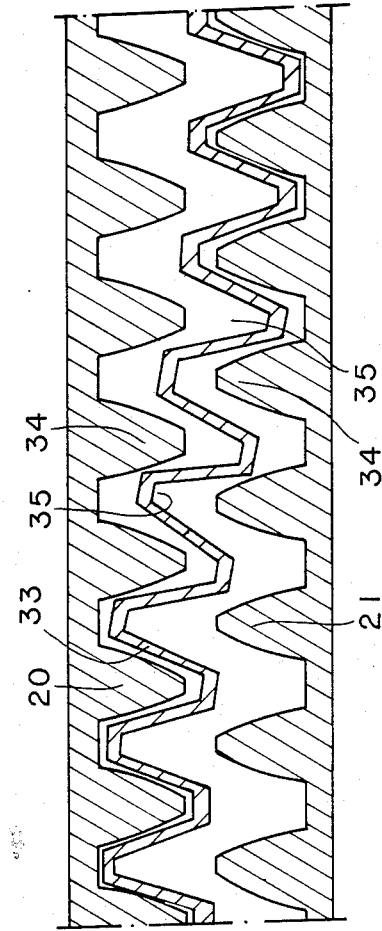
FIG. 6 is a cross-section developed at the level A—A and extending over a half-revolution.

The kinematics described above function properly only if the oscillating plate is completely immobilized against rotation, while being capable of oscillating freely. This device for immobilizing the oscillating plate against rotation can advantageously be produced by providing, round the hub 13, a part 33 which extends radially outwards and has on each side notches 35 which can engage in corresponding teeth 34 located respectively on the two components 20 and 21. Referring to FIG. 6, which shows a developed cross-section made at the level of a cylindrical surface passing through A—A and extending approximately over a half-revolution of the engine, we can see in detail the constructive arrangement of the part 33 of the oscillating plate which interacts respectively with the teeth of the components 20 and 21. It will be noted that, according to this cross-section A—A, the part 33 of the oscillating plate has a corrugated shape forming teeth on either side, and it may be said, in general terms, that the components 20 and 21 have teeth 34 arranged so as to form a conical pinion having a vertex merging substantially with the center O, and that the same applies to the teeth located on either side of the part 33 of the oscillating plate. The number of teeth of the oscillating plate is, of course, equal to the number of teeth 34 of the components 20 and 21.

What is claimed is:

1. A stirling-cycle engine, comprising a housing in which are assembled a rotating shaft, at least three working cylinders arranged in parallel about said shaft, a double-acting piston in each of said cylinders, and a mechanical transmission converting reciprocating movement of said pistons to rotary movement of said shaft, said housing having a first chamber (1) in which said rotating shaft is assembled, and a second chamber (2) in which said mechanical transmission is assembled, said mechanical transmission consisting of an oscillating plate (13, 14) which is immobile against rotation and has an orbital movement and the axis of which describes a conical surface about said rotating shaft, and of articulated connections (15–22) linking each said piston (4) to said oscillating plate, an elastic gasket (18, 19) being located between said housing (11) and said oscillating plate (13, 14) so as to prevent any communication between said first chamber (1) and said second chamber (2), each of said articulated connections (15, 22) being placed in a receptacle (3) of a component rigidly connected to said piston (4), a third chamber contained in said receptacle (3) being isolated from said second chamber (2) by elastic gaskets (23).

2. A stirling-cycle engine as claimed in claim 1, wherein said oscillating plate has the form of a hub (13) with radially extending arms (14), said hub (13) being mounted rotatably about a central part of said rotating shaft (5) along an axis of rotation forming a predetermined angle with the axis of rotation of said shaft (5), an elastic gasket (18, 19) consisting of two bellows being arranged around said hub (13), one of said bellows (18) connecting in a sealing manner one end of said hub (13)

and a radial web (20) connected to said housing (11), and the other of said bellows (19) connecting in a sealing manner the other end of said hub (13) and another radial web (21) connected to said housing (11).

3. Stirling-cyle engine as claimed in claim 1, wherein said oscillating plate is connected to each said piston (4) by means of two push-rods (15) located on either side of said oscillating plate (13, 14) and articulated to it by means of a ball joint (22), said elastic gaskets (23) consisting of two bellows (23, 23'), one of said bellows (23) connecting in a sealing manner one of said push-rods (15) to a peripheral zone of the spherical part of the ball joint (32) connected to said oscillating plate (14), the other of said bellows (23') connecting in a sealing manner the other push-rod (15') to a peripheral zone of the spherical part of said ball joint (32).

4. Stirling-cycle engine as claimed in claim 2, wherein said radial webs (20, 21) connected to said housing (11) both have peripheral teeth (34) directed towards a radial widened portion (33) of said oscillating plate, said widened portion (33) having on each side corresponding teeth (35) which engage alternately with one or other of the teeth (34) of said two radial webs (20 and 21), the number of teeth of said radial widened portion (33) of said oscillating plate being identical to the number of teeth of said webs (20 and 21).

5. Stirling-cycle engine as claimed in claim 4, wherein said first chamber (1) contains an atmosphere which makes it possible to lubricate bearings (25, 26) located between said housing and said shaft (5) and bearings (34, 36) located between said hub (13) and said shaft (5), said third chamber (3) containing an incompressible liquid lubricant which ensures the lubrication of said connections of said ball joint (32), said second chamber (2) isolated from said first (1) and third (3) chambers containing a gas free of any contaminating element and having the same nature as the working gas of said engine, and said second chamber (2) collecting or feeding the leakage gases passing between a said double-acting piston (4) and cylinders (12) and (12') associated therewith.

* * * * *